Patented Oct. 14, 1947

2,428,860

UNITED STATES PATENT OFFICE 2,428,860

TETRAHYDRODURYLIC ACID

James A. Van Allan and Jean Elmore Jones, Rochester, N. Y., assignors to Eastman Kodak Company, Rochester, N. Y., a corporation of New Jersey No Drawing. Application August 8, 1945, Serial No. 609,728

1 Claim. (Cl. 260—514)

This invention relates to tetrahydrodurylic acid and a process of preparing it. One object of our invention is to provide a new compound, 1,2,3,6-tetrahydrodurylic acid. Another object is to provide a process of preparing this compound. Still another object is to provide a process of preparing its dehydrogenation product, durylic acid.

We have discovered that 1,2,3,6-tetrahydrodurylic acid can be prepared by a Diels-Alder or diene synthesis from 2,3-dimethyl butadiene and crotonic acid, and can be dehydrogenated by means of bromine or sulfur to give durylic acid. The equations representing these reactions are:

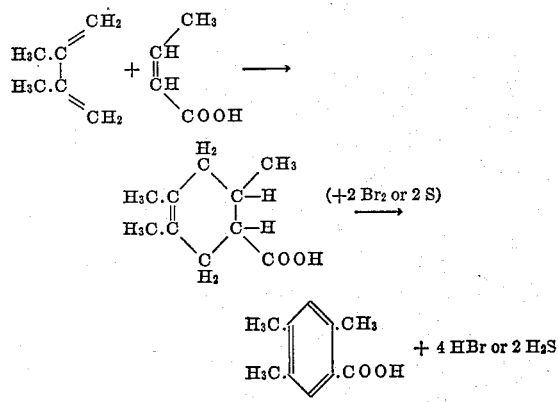

By way of illustrating the method of carrying out our invention, we give the following examples.

Example 1. *1,2,3,6-tetrahydrodurylic acid.*—A mixture of 15 parts of crotonic acid, 15 parts of 2,3-dimethyl-butadiene and 50 parts of benzene was heated in a sealed vessel to 160° C. for 3 hours. After cooling, the product was extracted with 100 parts of 5% sodium hydroxide. Acidification yielded 22 parts of product, M. P. 123–125° C. One recrystallization from acetic acid raised the melting point to 129° C. Analyses: Calcd. for $C_{10}H_{16}O_2$: C, 71.50; H, 7.54. Found: C, 71.52; H, 7.39.

Example 2. *Durylic acid.*—Three parts of tetrahydrodurylic acid obtained in Example 1, 6.1 parts of bromine, and 5 parts of acetic acid were refluxed until the evolution of hydrogen bromide had ceased. After evaporating the acetic acid, the residue was taken up in dilute sodium hydroxide and decolorized by Norit. Acidification yielded 2.45 parts of product, M. P. 135–139° C. Recrystallization from benzene yielded pure durylic acid.

Example 3. *Durylic acid.*—Five parts of the tetrahydrodurylic acid obtained in Example 1, and 2 parts of sulfur, were heated at 190–200° C. After the vigorous evolution of hydrogen sulfide had slowed, the dehydrogenation was completed by heating the melt at 220–230° C. for 2 hours. The product was dissolved in dilute sodium hydroxide, filtered, and acidified. Four parts of crude durylic acid, M. P. 139–142° C., was obtained. One crystallization from benzene gave 3 parts (a 60% overall yield) of pure durlyic acid, M. P. 148–149° C.

Durylic acid is a valuable intermediate in the synthesis of photographic developers and pyromellitic acid.

What we claim as our invention and desire to be secured by Letters Patent of the United States is:

As a new compound, 1,2,3,6-tetrahydrodurylic acid.

JAMES A. VAN ALLAN.
JEAN ELMORE JONES.

REFERENCES CITED

The following references are of record in the file of this patent:

UNITED STATES PATENTS

| Number | Name | Date |
|---|---|---|
| 784,411 | Merling et al. | Mar. 7, 1905 |
| 2,197,880 | Schroter et al. | Apr. 23, 1940 |

FOREIGN PATENTS

| Number | Country | Date |
|---|---|---|
| 300,130 | Great Britain | Mar. 5, 1930 |
| 341,047 | Great Britain | Jan. 9, 1931 |

OTHER REFERENCES

Ser. No. 385,136, Hopff et al. (A. P. C.) pub. Apr. 20, 1943.